(12) United States Patent
Komitsu et al.

(10) Patent No.: US 9,657,623 B2
(45) Date of Patent: May 23, 2017

(54) EXHAUST TREATMENT DEVICE

(71) Applicant: TOYOTA JIDOSHA KABUSHIKI KAISHA, Toyota-shi, Aichi-ken (JP)

(72) Inventors: Hideyuki Komitsu, Toyota (JP); Shoji Ogimura, Toyota (JP); Tomoyuki Kishida, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/036,637

(22) PCT Filed: Nov. 7, 2014

(86) PCT No.: PCT/JP2014/080130
§ 371 (c)(1),
(2) Date: May 13, 2016

(87) PCT Pub. No.: WO2015/076186
PCT Pub. Date: May 28, 2015

(65) Prior Publication Data
US 2016/0290202 A1    Oct. 6, 2016

(30) Foreign Application Priority Data
Nov. 22, 2013   (JP) ................. 2013-242241

(51) Int. Cl.
*F02M 25/06*   (2016.01)
*F01N 3/20*   (2006.01)
(Continued)

(52) U.S. Cl.
CPC ............ *F01N 3/2026* (2013.01); *F01N 3/02* (2013.01); *F01N 3/103* (2013.01); *F01N 3/2013* (2013.01);
(Continued)

(58) Field of Classification Search
CPC ...... F01N 3/103; F01N 3/2013; F01N 3/2026; F01N 13/1811
(Continued)

(56) References Cited

U.S. PATENT DOCUMENTS

| 5,325,665 A | 7/1994 | Kiso et al. |
| 5,678,403 A * | 10/1997 | Kanehara ............... F01N 3/037 60/279 |
| 2011/0232275 A1 * | 9/2011 | Watanabe ............... F01P 3/12 60/321 |

FOREIGN PATENT DOCUMENTS

| JP | H05-32712 U | 4/1993 |
| JP | 05222927 A * | 8/1993 |

(Continued)

OTHER PUBLICATIONS

English translation of Japanese Patent Application Publication No. JP 05222927 A (Aug. 1993).*

Primary Examiner — Jason Shanske
(74) Attorney, Agent, or Firm — Oliff PLC

(57) ABSTRACT

A decrease in cost is devised at an exhaust treatment device that purifies exhaust from an internal engine by a catalyst that is heated from a catalyst support that generates heat by being energized, and that returns some of exhaust that has been purified to the internal combustion engine. A cooling member is provided at a portion of an exhaust pipe that is between an engine and an upstream catalytic converter, and a circulation pipe is branched-off from between the upstream catalytic converter and a vibration cut-off member that is at a downstream side.

6 Claims, 1 Drawing Sheet

(51) Int. Cl.
*F01N 3/10* (2006.01)
*F01N 13/18* (2010.01)
*F01N 3/02* (2006.01)
*F01N 13/00* (2010.01)
*F02M 26/15* (2016.01)

(52) U.S. Cl.
CPC ........ *F01N 13/009* (2014.06); *F01N 13/1811* (2013.01); *F01N 13/1816* (2013.01); *F02M 26/15* (2016.02); *F01N 2340/02* (2013.01); *Y02T 10/26* (2013.01)

(58) Field of Classification Search
USPC .......................................................... 60/278
See application file for complete search history.

(56) References Cited

FOREIGN PATENT DOCUMENTS

| | | |
|---|---|---|
| JP | 2010-112355 A | 5/2010 |
| JP | 2010-144668 A | 7/2010 |
| JP | 2010-151024 A | 7/2010 |
| JP | 2011-132870 A | 7/2011 |
| JP | 2011-196211 A | 10/2011 |
| JP | 2012-107567 A | 6/2012 |

* cited by examiner

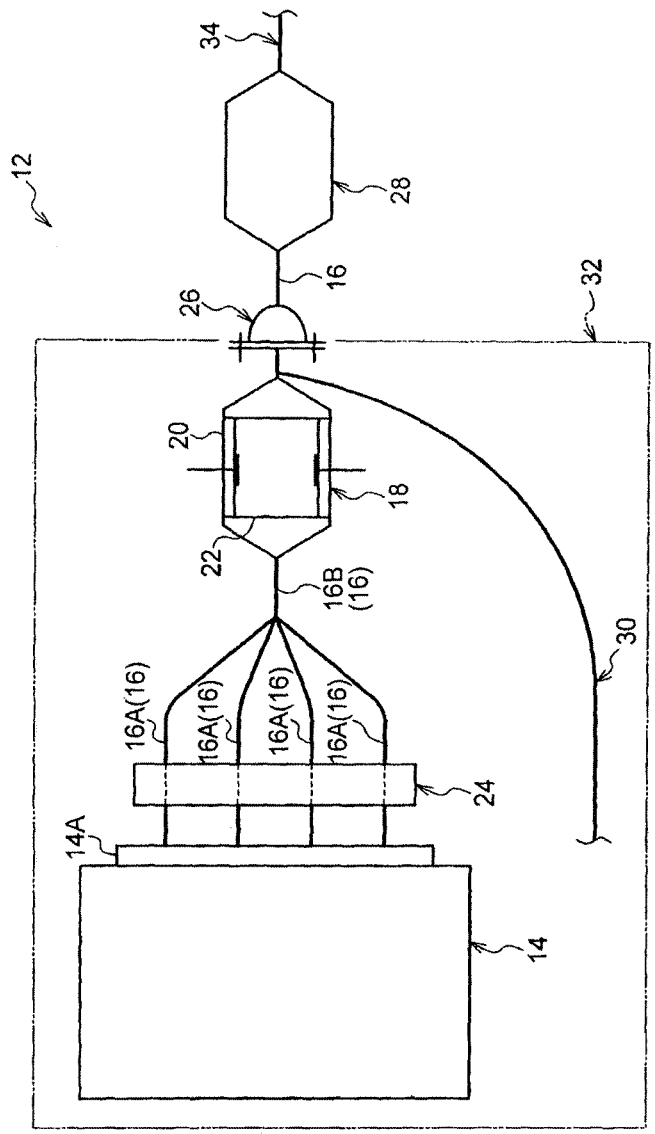

EXHAUST TREATMENT DEVICE

TECHNICAL FIELD

The present invention relates to an exhaust treatment device that treats exhaust of an internal combustion engine.

BACKGROUND ART

There are structures in which, in order to purify exhaust that is generated at an internal combustion engine, an electric-heating-type catalyst, that has a catalyst support that by being energized generates heat and heats the catalyst, is provided at the exhaust path from the internal combustion engine (see, for example, Japanese Patent Application Laid-Open (JP-A) No. 2012-107567: Patent Document 1).

DISCLOSURE OF INVENTION

Technical Problem

There are cases in which resistance, to heat from the exterior, of a catalyst support that generates heat by being energized is low, and therefore, it is desirable to place the catalyst support at a position that is far from the internal combustion engine (a position at which exhaust whose temperature has dropped passes).

By the way, in a case in which a circulation pipe that returns (circulates) some of the exhaust from the internal combustion engine to the internal combustion engine is provided, the circulation pipe must be connected to the downstream side of the catalytic converter that is nearest to the internal combustion engine (the circulation pipe must branch-off from a pipe). In this case, a member that cuts-off vibrations of the internal combustion engine must be provided at each of the circulation pipe and the portion of the exhaust pipe that is between the internal combustion engine and the catalytic converter, which leads to an increase in cost.

In consideration of the above-described circumstances, an object of the present invention is to aim for a reduction in cost at an exhaust treatment device that purifies exhaust from an internal combustion engine by a catalyst that is heated from a catalyst support that generates heat by being energized, and that returns some of the exhaust that has been purified to the internal combustion engine.

Solution to Problem

An exhaust treatment device relating to a first aspect of the present invention comprises: a catalytic converter that is provided on an exhaust path through which exhaust discharged from an internal combustion engine passes, and that has a catalyst support that generates heat by being energized, and that purifies the exhaust by a catalyst supported by the catalyst support; a cooling member that is provided on a portion of the exhaust path from the internal combustion engine to the catalytic converter, and that cools the exhaust; a vibration cut-off member that is provided on the exhaust path further toward a downstream side than the catalytic converter, and that cuts-off vibrations from the internal combustion engine; and a circulation pipe that branches off from a portion of the exhaust path between the catalytic converter and the vibration cut-off member, and that is for circulating some of exhaust from the catalytic converter to the internal combustion engine.

In this exhaust treatment device, exhaust that is discharged from the internal combustion engine is purified by the catalyst supported by the catalyst support of the catalytic converter. Because the catalyst support generates heat by being energized, the catalyst that is supported by the catalyst support is heated, and, in a case in which the temperature of the exhaust is low for example, the purifying effect by the catalyst can be exhibited well.

The cooling member is provided on a portion of the exhaust path that is from the internal combustion engine to the catalytic converter. The cooling member cools the exhaust from the internal combustion engine. Accordingly, even in a case in which the catalyst support has low heat resistance, the catalytic converter can be disposed at a position near the internal combustion engine, and compactness of the exhaust treatment device can be devised.

The vibration cut-off member is provided on the exhaust path at the downstream side of the catalytic converter. Moreover, the circulation pipe branches-off from a portion of the exhaust path that is between the catalytic converter and the vibration cut-off member. Namely, a single member, that is disposed on the exhaust path further downstream than the branching portion of the circulation pipe, suffices as the vibration cut-off member, and there is no need to provide a vibration cut-off member for each of the exhaust path and the circulation pipe. Therefore, a decrease in cost can be devised.

An exhaust treatment device relating to a second aspect further comprises, in the first aspect, a downstream catalytic converter that is provided on the exhaust path further toward a downstream side than the vibration cut-off member.

An exhaust treatment device relating to a third aspect further comprises, in the first or second aspect, an engine room at whose interior are disposed the catalytic converter, the cooling member and the circulation pipe.

In an exhaust treatment device relating to a fourth aspect, in the third aspect, the vibration cut-off member and the downstream catalytic converter are provided outside of the engine room.

In an exhaust treatment device relating to a fifth aspect, in any of the first through fourth aspects, the exhaust path has branched pipe portions whose paths are branched, and the cooling member is disposed at the branched pipe portions.

In an exhaust treatment device relating to a sixth aspect, in any of the first through fourth aspects, the exhaust path has branched pipe portions whose paths are branched, and a merged pipe portion at which the branched pipe portions are consolidated into one pipe, and the cooling member is disposed at the merged pipe portion.

In an exhaust treatment device relating to a seventh aspect, in any of the first through fourth aspects, the cooling member is disposed at a connected portion of the internal combustion engine and the exhaust path.

Advantageous Effects of Invention

Because the present invention is structured as described above, a reduction in cost is devised at an exhaust treatment device that purifies exhaust from an internal combustion engine by a catalyst that is heated from a catalyst support that generates heat by being energized, and that returns exhaust that has been purified to the internal combustion engine.

BRIEF DESCRIPTION OF DRAWINGS

The FIGURE is a schematic drawing showing an exhaust treatment device of a first embodiment of the present invention.

BEST MODE FOR CARRYING OUT THE INVENTION

An exhaust treatment device 12 of a first embodiment of the present invention is shown in the FIGURE together with an engine 14.

The upstream end of an exhaust pipe 16 for discharging exhaust is connected to a cylinder head 14A of an engine 14. Hereinafter, "upstream" and "downstream" respectively mean the upstream and the downstream of the flow of exhaust within the exhaust pipe 16.

The upstream side of the exhaust pipe 16 is branched-off in accordance with, for example, the number of cylinders of the engine 14, and becomes branched pipe portions 16A. At the downstream side of the branched pipe portions 16A, the branched pipe portions 16A become a merged pipe portion 16B in which they are consolidated into a single pipe.

An upstream catalytic converter 18 (corresponding to the catalytic converter in the present invention) is provided at an intermediate portion of the merged pipe portion 16B. The upstream catalytic converter 18 has a case 20 whose diameter is larger than that of the exhaust pipe 16. A catalyst support 22 that generates heat by being energized is mounted within the case 20. A catalyst that purifies specific components within the exhaust (e.g., hydrocarbons) is supported by the catalyst support 22. The catalyst is heated due to the catalyst support 22 generating heat by being energized. Accordingly, even if, for example, there is a state in which the exhaust temperature is low (such as immediately after start-up of the engine 14, or the like) the exhaust purifying effect by the catalyst can be exhibited well.

A cooling member 24 is provided at, of the exhaust pipe 16, a portion thereof that is from the engine 14 to the upstream catalytic converter 18 (at the branched pipe portions 16A in the example shown in the FIGURE). The exhaust that is discharged from the engine 14 can be cooled by the cooling member 24.

The cooling member 24 is not particularly limited provided that it can cool the exhaust in this way. An example is a cooling member that is structured, for example, so as to have a cooling water flow path that surrounds the exhaust pipe 16 and such that cooling water flows in this cooling water flow path.

A vibration cut-off member 26 and a downstream catalytic converter 28 are provided, in that order from the upstream side, on a portion of the exhaust pipe 16 that is at the downstream side of the upstream catalytic converter 18. Moreover, a circulation pipe 30 branches-off from a portion of the exhaust pipe 16 that is from the upstream catalytic converter 18 to the vibration cut-off member 26. The circulation pipe 30 is a pipe that returns to the engine some of or all of the exhaust from a portion of the exhaust pipe 16 that is further toward the downstream side than the upstream catalytic converter 18, and is for circulating the exhaust.

The vibration cut-off member 26 cuts-off vibrations that are applied from the engine 14 to the exhaust pipe 16 and the upstream catalytic converter 18 (although there is no need to completely cut-off the vibrations), and is a member that damps vibrations at the downstream side. A so-called spherical joint for example can be used as the structure of the vibration cut-off member 26. In a spherical joint, an elastic body made of rubber or the like is accommodated within a housing, and vibrations from the engine 14 can be damped by elastic deformation of this elastic body.

For example, a catalyst that is the same as the catalyst of the upstream catalytic converter 18, or yet another catalyst, is accommodated in the downstream catalytic converter 28. Further, components within the exhaust that are not treated at the upstream catalytic converter 18 can be treated at the downstream catalytic converter 28.

Further, the path, through which exhaust from the cylinder head 14A of the engine 14 passes, structures an exhaust path 34 of the present application. Concretely, the members, from the cylinder head 14A to the portion of the exhaust pipe 16 that reaches even further downstream than the downstream catalytic converter 28, are the exhaust path 34. Further, the cooling member 24 is provided at, of this exhaust path 34, a portion that is between the engine 14 and the upstream catalytic converter 18.

The circulation pipe 30 branches-off from a portion of the exhaust pipe 16 that is at the downstream side of the upstream catalytic converter 18 (between the upstream catalytic converter 18 and the vibration cut-off member 26). The circulation pipe 30 returns some or all of the exhaust, that has passed-through the upstream catalytic converter 18, to the engine 14. Namely, the circulation pipe 30 is a pipe for circulating, to the engine 14, some or all of the exhaust that has been discharged from the engine 14.

Operation of the present embodiment is described next.

As can be understood from the FIGURE, in the exhaust treatment device 12 of the present embodiment, exhaust that has been discharged from the engine 14 can be purified by the catalyst that is supported by the catalyst support 22 of the upstream catalytic converter 18. In particular, in the present embodiment, the catalyst support 22 generates heat by being energized, and the catalyst is heated. Even in a case in which the temperature of the exhaust is low such as, for example, immediately after start-up of the engine 14 or the like, the exhaust purifying effect by the catalyst can be exhibited well.

The cooling member 24 is provided at a portion of the exhaust pipe 16 that is from the engine 14 to the upstream catalytic converter 18. Exhaust from the engine 14 is cooled by the cooling member 24. Namely, as compared with a structure in which there is no cooling member 24, the amount of heat that is applied from the exhaust to the catalyst support of the upstream catalytic converter 18 is small. Even in cases in which the heat-resistance of the catalyst support 22 is low, the upstream catalytic converter 18 can be placed at a position near the engine 14, and compactness of the exhaust treatment device 12 can be devised. For example, the portion from the engine 14 through the exhaust pipe 16 and the upstream catalytic converter 18 to the vibration cut-off member 26, can be disposed within an engine room 32.

The vibration cut-off member 26 is provided at a portion of the exhaust pipe 16 that is further toward the downstream side than the upstream catalytic converter 18. Because vibrations of the engine 14 are cut-off by the vibration cut-off member 26, the vibrations from the engine 14 are applied to the downstream catalytic converter 28 (outside of the engine room 32) while having been damped.

Further, in the present embodiment, the circulation pipe 30 branches-off from a portion of the exhaust pipe 16 that is between the upstream catalytic converter 18 and the vibration cut-off member 26, and the entire circulation pipe 30 is disposed within the engine room 32. Namely, a single member, that is disposed between the upstream catalytic converter 18 and the downstream catalytic converter 18, alone suffices as the vibration cut-off member 26. In a structure in which the upstream catalytic converter 18 is far from the engine 14 and is disposed outside the engine room 32, a vibration cut-off member must be provided for each of the exhaust pipe 16 and the circulation pipe 30. However, in the present embodiment, as described above, it suffices for there to be the one vibration cut-off member 26. Therefore, the structure of the exhaust treatment device 12 is simple, and a reduction in cost can be devised.

The downstream catalytic converter 28 is provided downstream of the upstream catalytic converter 18. A catalyst that is the same as the catalyst supported by the catalyst support 22 of the upstream catalytic converter 18, or yet another catalyst, is accommodated at the downstream catalytic converter 28. Components within the exhaust that are not treated at the upstream catalytic converter 18 can be treated at the downstream catalytic converter 28. For example, there can be a structure in which hydrocarbons within the exhaust are treated at the upstream catalytic converter 18, and nitrogen oxides within the exhaust are treated at the downstream catalytic converter 28.

In the above description, there is an example in which the cooling member 24 is disposed at the branched pipe portions 16A at a portion of the exhaust pipe 16 that is from the engine 14 to the upstream catalytic converter 18. However, the position of the cooling member 24 is not particularly limited provided that it is on a portion of the exhaust path 34 that is from the engine 14 to the upstream catalytic converter 18. For example, the cooling member 24 may be provided at the cylinder head 14A of the engine 14 (the portion connected to the exhaust pipe 16), or at the merged pipe portion 16B.

The disclosure of Japanese Patent Application No. 2013-242241 is, in its entirety, incorporated by reference into the present specification.

All publications, patent applications, and technical standards mentioned in the present specification are incorporated by reference into the present specification to the same extent as if each individual publication, patent application or technical standard was specifically and individually indicated to be incorporated by reference.

The invention claimed is:

1. An exhaust treatment device comprising:
   an engine room in which an internal combustion engine is disposed;
   an upstream catalytic converter that is disposed inside the engine room and is provided on an exhaust path through which exhaust discharged from the internal combustion engine passes, and that has a catalyst support that generates heat by being energized, and that purifies the exhaust by a catalyst supported by the catalyst support;
   a cooling member that is provided on a portion of the exhaust path from the internal combustion engine to the upstream catalytic converter, and that cools the exhaust;
   a downstream catalytic converter that is provided on the exhaust path further toward a downstream side than the upstream catalytic converter;
   a vibration cut-off member that is provided on the exhaust path further toward a downstream side than the upstream catalytic converter and further toward an upstream side than the downstream catalytic converter, and that cuts-off vibrations from an inside of the engine room to the outside of the engine room; and
   a circulation pipe that branches off, inside the engine room, from a portion of the exhaust path between the upstream catalytic converter and the vibration cut-off member, and that is for circulating some of exhaust from the upstream catalytic converter to the internal combustion engine.

2. The exhaust treatment device of claim 1, wherein the cooling member and the circulation pipe are disposed inside the engine room.

3. The exhaust treatment device of claim 2, wherein the vibration cut-off member and the downstream catalytic converter are provided outside of the engine room.

4. The exhaust treatment device of claim 1, wherein the exhaust path has branched pipe portions whose paths are branched, and the cooling member is disposed at the branched pipe portions.

5. The exhaust treatment device of claim 1, wherein the exhaust path has branched pipe portions whose paths are branched, and a merged pipe portion at which the branched pipe portions are consolidated into one pipe, and the cooling member is disposed at the merged pipe portion.

6. The exhaust treatment device of claim 1, wherein the cooling member is disposed at a connected portion of the internal combustion engine and the exhaust path.

* * * * *